UNITED STATES PATENT OFFICE.

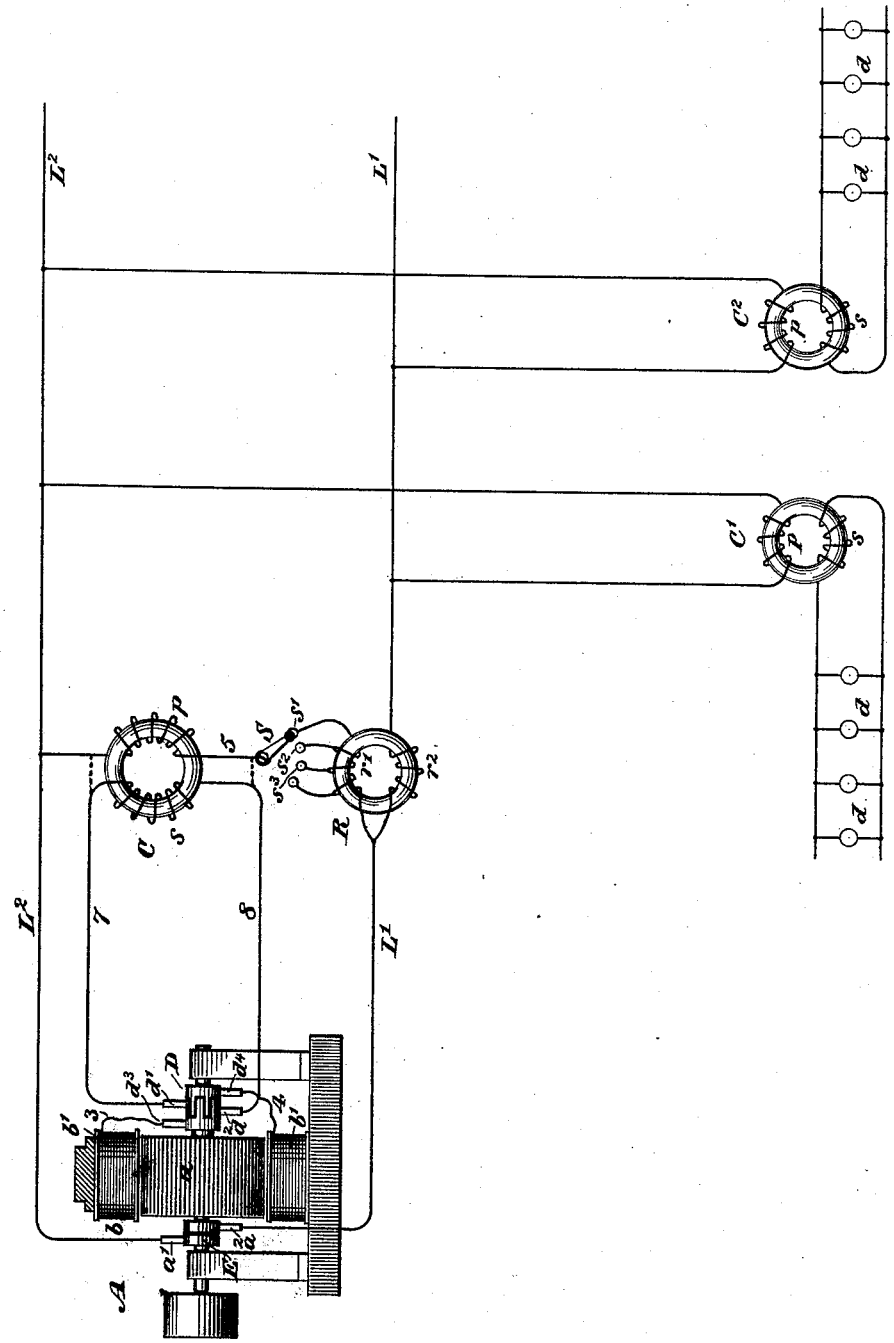

WILLIAM STANLEY, JR., OF GREAT BARRINGTON, MASSACHUSETTS, ASSIGNOR TO THE WESTINGHOUSE ELECTRIC AND MANUFACTURING COMPANY, OF PITTSBURG, PENNSYLVANIA.

METHOD OF REGULATING SELF-EXCITING ALTERNATE-CURRENT ELECTRIC GENERATORS.

SPECIFICATION forming part of Letters Patent No. 508,493, dated November 14, 1893.

Application filed October 18, 1888. Serial No. 288,449. (No model.)

*To all whom it may concern:*

Be it known that I, WILLIAM STANLEY, Jr., a citizen of the United States, residing in Great Barrington, in the county of Berkshire and State of Massachusetts, have invented a certain new and Improved Method of Regulating Self-Exciting Alternate-Current Electric Generators, (Case No. 208,) of which the following is a specification.

The invention relates to a method of producing alternating electric currents of an approximately constant difference of potential.

The object of the invention is to provide a method of causing an alternate-current electric generator to be excited by currents derived from its armature, and to cause the field magnet strength to be varied in accordance with the variations in the current consumed in the work circuit, so that an approximately constant difference of potential may be maintained between the terminals of the generator.

In general terms the invention may be said to consist in supplying the field-magnet coils with a rectified current derived from the secondary coil of an electric converter, the primary of which is included in a shunt around the work circuit or across from one terminal to the other of the generator. One coil of a differentially wound inductive resistance is included in series with the primary coil of the converter, while the other coil of this resistance is included in series with the work circuit. The variations in the resistance or counter electromotive force developed by reason of this inductive resistance, governs the current through the primary of the converter and thus regulates the current delivered to the field-magnet coils.

In another application filed September 1, 1887, Serial No. 248,487, the apparatus herein described is claimed.

In the accompanying drawing there is shown, partly in diagram, an organization of circuits and apparatus adapted to carry out the invention.

Referring to the figure, A represents an alternate-current generator, having an armature $a$ and a field-magnet $b$. The field-magnet coils $b'$ are designed to be supplied with rectified currents derived, in a manner to be described, from the conductors $L'$ and $L^2$ which respectively lead from the brushes $a'$, $a^2$, applied to the collector E. The collector E consists of two rings respectively connected with the terminals of the armature coils, in a manner well understood. The lines $L'$, $L^2$, supply converters $C'$, $C^2$, which have, in this instance, their secondary coils $s, s$, connected through translating devices $d, d$, while the primary coils $p$ are connected in the multiple arc between the lines $L'$, $L^2$. The organization of the work-circuit, however may be variously modified. Between the lines $L'$, $L^2$, there is connected the primary coil $p$ of a converter C. The secondary coil $s$ of this converter has its respective terminals connected, by conductors 7 and 8, with the contact brushes $d'$, $d^2$, of a rectifying commutator D. This commutator may be carried upon the shaft of the generator A. The other brushes $d^3$ and $d^4$ of this commutator are connected by conductors 3 and 4 with the respective terminals of the field-magnet coils $b'$ of the generator; and therefore rectified currents will be delivered to these coils.

For the purpose of rendering the strength of the rectified current which is delivered to the field-magnet coils, dependent upon the variations in the work being done, an inductive resistance R is employed. This consists of a soft iron core wound with two coils $r'$, $r^2$, which oppose each other. The coil $r'$ is connected in series with the coil $p$ of the converter C, while the coil $r^2$ is connected in the line $L'$ leading to the work-circuit, and thus in series with the devices to be operated. Now it is evident that, in order to maintain a constant difference of potential between the terminals of the armature, the field excitement must be increased when the difference of potential between the terminals of the armature falls off or decreases, and vice versa. It is also evident that the difference of potential between the brushes $a'$ and $a^2$ will tend to be lower when a considerable current is flowing through the main line, than when little current is flowing. The fluctuations or variations of current flowing through the main line are employed for automatically varying the counter electromotive force developed in the resistance R, thereby varying the electromotive force applied to the converter C, and thus in turn varying the electromotive force applied to the field-magnet coils. If now, equal currents flow through the coils $r'$ and $r^2$, no counter electromotive force will be developed in the resistance R, but as the work being done is diminished, less current will flow through the coil $r^2$, and thus more counter electromotive force will be developed in the coil $r'$, thus diminishing the current which will flow through the coil $p$ of the converter C. This in turn diminishes the current delivered to the field-magnet coils. If now more current is required in the work-circuit, the inductive resistance or counter-electromotive force in the coil $r'$ will be diminished, allowing more current to pass through the coil $p$ of the converter C.

The ratio of the converter C and the inductive resistance R, may be varied in any manner desired so that the required current for supplying the field-magnets may be obtained; and the coil $s$ of the converter C may be constructed with reference to the coil $p$ so as to reduce or increase the difference of potential at the terminals of the field-magnet coils as required. It may be desirable in some instances to construct the coil $r'$ so that its active length may be varied to accommodate the apparatus to the particular requirements of a system. This may be accomplished by means of a switch S connected with a conductor 5 and applied to switch points $s'$ and $s^2$ and $s^3$ connected with different points in the length of the coil $r'$.

The field-magnet coils may be supplied with currents directly from the conductor 5, without the interposition of the converter C, as indicated by the dotted lines.

I claim as my invention—

The method of maintaining a constant potential at the terminals of an alternate current generator, which consists in exciting the field-magnet of the generator by a current derived solely from a circuit in shunt with the work circuit and causing the work circuit to act inductively upon said shunt circuit to vary its counter electromotive force in inverse ratio to the quantity of the current in the work circuit.

In testimony whereof I have hereunto subscribed my name this 11th day of October, A. D. 1888.

WILLIAM STANLEY, JR.

Witnesses:
CHARLES A. TERRY,
C. C. WOLFE.